(12) United States Patent
White et al.

(10) Patent No.: US 7,367,406 B2
(45) Date of Patent: May 6, 2008

(54) INNOVATIVE HITCH SYSTEM WITH HYDRAULIC PUMP

(76) Inventors: Thomas B. White, 491 N. Main St., Southampton, NY (US) 11968; Bruce A. Peterson, 19 Parkside Ave., Southampton, NY (US) 11968

( * ) Notice: Subject to any disclaimer, the term of this patent is extended or adjusted under 35 U.S.C. 154(b) by 203 days.

(21) Appl. No.: 10/762,208

(22) Filed: Jan. 21, 2004

(65) Prior Publication Data

US 2004/0256124 A1   Dec. 23, 2004

Related U.S. Application Data

(63) Continuation-in-part of application No. 09/552,080, filed on Apr. 19, 2000, now Pat. No. 6,698,527.

(51) Int. Cl.
  *A01B 59/06*   (2006.01)
(52) U.S. Cl. .................. 172/439; 172/677; 172/450
(58) Field of Classification Search ............. 172/439, 172/440, 677, 679, 450
See application file for complete search history.

(56) References Cited

U.S. PATENT DOCUMENTS

| | | | | |
|---|---|---|---|---|
| 2,824,724 A | * | 2/1958 | Porsche | 165/52 |
| 4,337,737 A | * | 7/1982 | Pechner | 123/196 AB |
| 4,424,982 A | * | 1/1984 | Weiss | 280/461.1 |
| 4,643,442 A | * | 2/1987 | Ohashi et al. | 280/461.1 |
| 4,687,069 A | * | 8/1987 | Inomata et al. | 180/68.2 |
| 4,690,236 A | * | 9/1987 | Shinozaki et al. | 180/219 |
| 4,902,059 A | * | 2/1990 | Tritton | 293/117 |
| 4,971,171 A | * | 11/1990 | Yamada et al. | 180/68.1 |
| 5,653,206 A | * | 8/1997 | Spurgin | 123/196 AB |
| 6,006,390 A | * | 12/1999 | Bischel et al. | 15/82 |
| 6,994,150 B1 | * | 2/2006 | Kline | 165/41 |

FOREIGN PATENT DOCUMENTS

JP   5-338573   * 12/1993

* cited by examiner

*Primary Examiner*—Thomas B. Will
*Assistant Examiner*—Jamie L McGowan
(74) *Attorney, Agent, or Firm*—Thomas A. O'Rourke; Bodner & O'Rourke, LLP

(57) ABSTRACT

A hydraulic system for an attachment for a tractor is disclosed. The hitch has a frame having a top member and a bottom member. The top and bottom members are joined together by a pair of side members forming a structure with an orifice. Each of the top and bottom members are hollow in a cross section, as are each of the side members so that a fluid contained in the members can flow from one member to another.

32 Claims, 9 Drawing Sheets

BACK VIEW

RIGHT SIDE VIEW

Top View

Bottom View

Support Foot

INNOVATIVE HITCH SYSTEM WITH HYDRAULIC PUMP

The present application is a continuation in part of U.S. application Ser. No. 09/552,080, filed Apr. 19, 2000 now U.S. Pat. No. 6,698,527.

FIELD OF THE INVENTION

The present invention relates to improvements in tractors and in particular tractors operating implements attached to the rear and the means for attaching the implements.

BACKGROUND OF THE INVENTION

Most tractors have an hydraulic system that supplies selective control valves or remotes at the back of the tractor. The hydraulic system also supplies other functions such as steering, brakes, transmission, shift clutches and the point hitches.

For many years nearly all tractors employed open center hydraulics. In open center hydraulic systems, the system's control valves are always open to the reservoir when in the neutral position. As a result, the pump constantly sends oil through the valves and back to the reservoir supplying the pump. These systems are generally preferred for intermittent use. One drawback is that the gear pumps used in these systems are speed sensitive. The faster the engine is run, the higher the flow rate. Also, in these systems heat build up is a problem. Open center systems generate heat from the friction of the constantly flowing oil.

Another type of tractor hydraulic system employs a variable displacement piston pump. These hydraulic systems are called closed center systems. In the closed center system the control valves remain closed to the reservoir and stop fluid flow to the valve while in the neutral position.

This invention relates to an improved hydraulic system primarily for open center hydraulic systems. This system has the benefit of reducing heat and increasing the longevity of a machine. A hydraulic system is a closed system that contains a hydraulic fluid such as oil, water or other fluid supplies lubrication, for example, to the hydraulic arms issued on a tractor or an implement attached to the tractor. The improvements relate primarily to an hydraulic tank which contains the hydraulic fluid. At present, the hydraulic systems used with tractor hitches use a tank that is attached to the hitch and is shaped more or less like a box. The problem with the present form is that when the hydraulic fluid is kept in this small box-like tank the hydraulic fluid can reach extremely high temperatures. This is due, for example, to frictional flow of the fluid or heavy or continuous use of implements. The same extremely hot hydraulic fluid makes contact with the implements and the hydraulic lift arms, and can cause the parts to break by wearing down the seals. This leads to increased cost of repair and replacement of the machinery. The extreme temperatures also make it difficult to remove or modify the positioning of the attachments in the middle of a project. Power and performance trade offs and smart hydraulic system techniques are required to prevent excessive temperatures. Thus, there is a need for a hydraulic system that will increase longevity of the machine by cooling the hydraulic fluid and preserving the seals of implements.

In order to keep the hydraulic fluid cooler the present invention provides an improved hydraulic tank that provides superior cooling of an hydraulic fluid. The design of the present invention provides increased heat dissipation that is not achieved with prior art devices. The present invention provides a larger surface area for the hydraulic tank thereby increasing the amount of heat that is dissipated and the hydraulic fluid does not become extremely hot. In prior art machines the small surface area results in hotter lubricating hydraulic fluid and thus faster wearing of parts and the faster the machine may be in need of repair.

It is generally known that the rate of convection heat transfer is observed to be proportional to the temperature difference. All material has a certain thermal resistance, the more heat energy flowing through it, the higher the temperature rise across it. Metals like copper and aluminum have very low thermal resistance, while air tends to have a relatively high resistance. A metal like aluminum with a very high thermal resistance would absorb heat produced by the hydraulic fluid and also have the advantage of quickly dissipating the heat into the air.

SUMMARY OF THE INVENTION

The present invention provides an apparatus for increasing the surface area of a reservoir to promote the cooling hydraulic fluid in a hydraulic system of a hitch attachment. The apparatus has particular use in open center hydraulic systems. For example, the apparatus can also include fins and heat sinks into the design. The fins can be made out of metal and preferably a metal that has a low thermal resistance but can also dissipate the heat quickly itself, such as aluminum. The unique structure of the cooling system of the present invention provides for lower operating temperatures for the hydraulic system.

The invention is not limited to incorporating only metal material into the design, any material with a low thermal resistance could be used, however metal is the most well-known. The temperature difference between the heat-sink surface and ambient air depends on the efficiency of heat spreading in the heat-sink base and fins. The amount of heat spreading depends primarily on the thermal conductivity of the heat-sink material and on the heat-sink geometry. For example, copper heat sinks have better spreading than aluminum heat sinks. Similarly, spreading is much better in a heat sink with a thicker base and thicker fins. Also the fins can be in a variety of shapes and also be present in a variety of numbers. Fins can be removable or fixed to increase surface area.

The shape of the tank has been designed to increase the surface area without increasing the bulk of the structure. Thus, the operator's view of the operation any attached implements and their operation is not impaired. In a preferred embodiment there is a rectangular tank with a hollow middle section that increases the surface area because there is more surfaces available for the hydraulic fluid to dissipate heat. The hydraulic tank could be generally circular or have the shape of any other polygon such as a pentagon or a trapezoid.

As surface area increases heat dissipation increases, therefore the surface areas must be at a minimum large enough for heat dissipation and at a maximum not too large that the tank becomes too cumbersome or cannot keep the hydraulic fluid viscous enough to lubricate the implements.

The invention described herein is directed to an improved hydraulic tank that is highly efficient in dissipating heat of hydraulic fluids such as oil and therefore increases the longevity of the machine. The hydraulic tank in the present invention permits the attachment to provide superior cooling of the hydraulic fluid.

Unlike other tractor hitches that have a separate tank attached to the hitch, the present invention actual transforms the containers into a more economic use of space that can incorporate couplings and flanges to permit traditional tractor attachments to be readily secured to the tank while at the same time not obscuring the operator's view of the attachment during operation.

The present invention comprises a hydraulic tank with range of surface areas that at a minimum keep the hydraulic fluid cool enough to increase the life of the machine and at a maximum keep the hydraulic fluid viscous enough to appropriately lubricate the implements and attachments.

The present invention also contemplates the use of fins and heat a sinks to increase the surface area and dissipate heat. The fins can be either permanent or removable.

The present invention also contemplates the use of insulation, in the form of, but not limited to, paint, padding, plastic or a combination of these. Furthermore, the fins could also be insulated. The insulation could also act as a safety measure and allow for movement of attachments while working.

OBJECTS OF THE INVENTION

The principle object of the present invention is to provide a hydraulic system that can reduce premature wear on internal parts.

It is another principle object of the present invention to provide a hydraulic system with a tank that has an increased surface area that allows for cooling of the hydraulic fluid that provides lubrication for the implements and other operations in an attachment hitch for a tractor and the like.

It is another object of the invention to provide a hydraulic system that can be modified to increase the surface area with the use of fins.

It is still another object of the invention to provide a hydraulic system that incorporates heat sinks to increase surface area and dissipate heat.

Another object of the invention is to provide a hydraulic cooling system with a reservoir of fluid in a generally circular shape or other polygon shape such as a trapezoid or a pentagon.

It is still further object of the present invention to provide a reservoir of fluid having an opening extending from one surface to another surface forming an opening in the reservoir.

Still another object of the invention is to present a hydraulic system that can cool hydraulic fluid by using metals with a low thermal resistance.

Still another object of the invention is to provide a hydraulic system that can cool hydraulic fluid by incorporating insulation to increase surface area.

It is an object of the present invention to provide an attachment for a tractor that can be readily connected to the rear of the tractor and provide for hydraulic cooling during operation of an implement.

It is also an object of the invention to provide an attachment for a tractor that can be attached to the rear of the tractor and provide hydraulic cooling while at the same time permitting a multitude of various operating devices or implements to be connected thereto.

It is another object of the invention to provide a cooling attachment for hydraulic fluid for a tractor or the like that permits the operator to view the operation of any implements connected to the device.

It is a still further object of the invention to provide a cooling device for a fluid such as oil and the like on a tractor.

It is another further object of the present invention to prevent hydraulic oil overheating during the operation of tractors while implements are being operated by the hitch attachment.

DETAILED DESCRIPTION OF THE DRAWINGS

Figure 1:
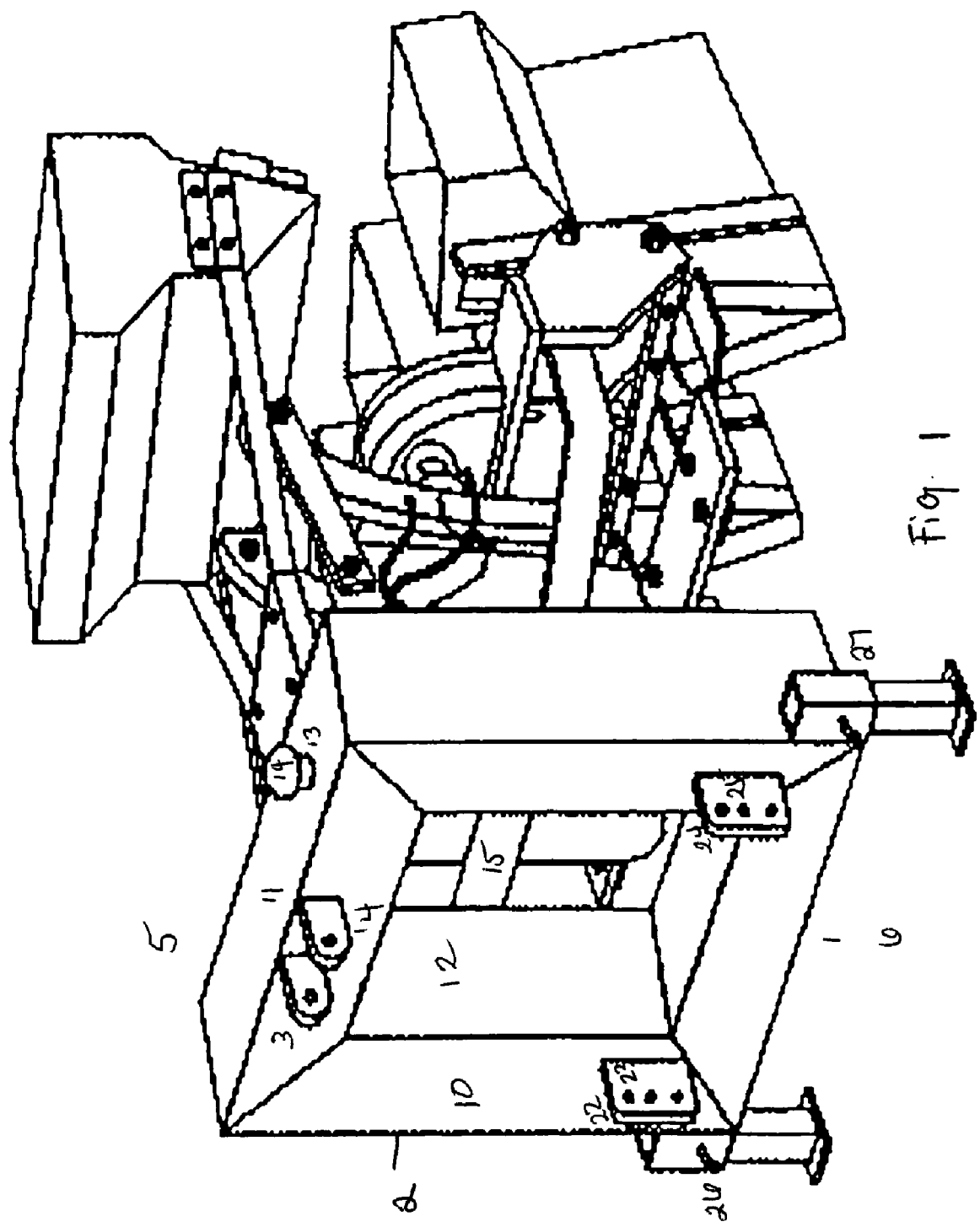
FIG. 1 is a perspective view of the present invention.
Figure 2:
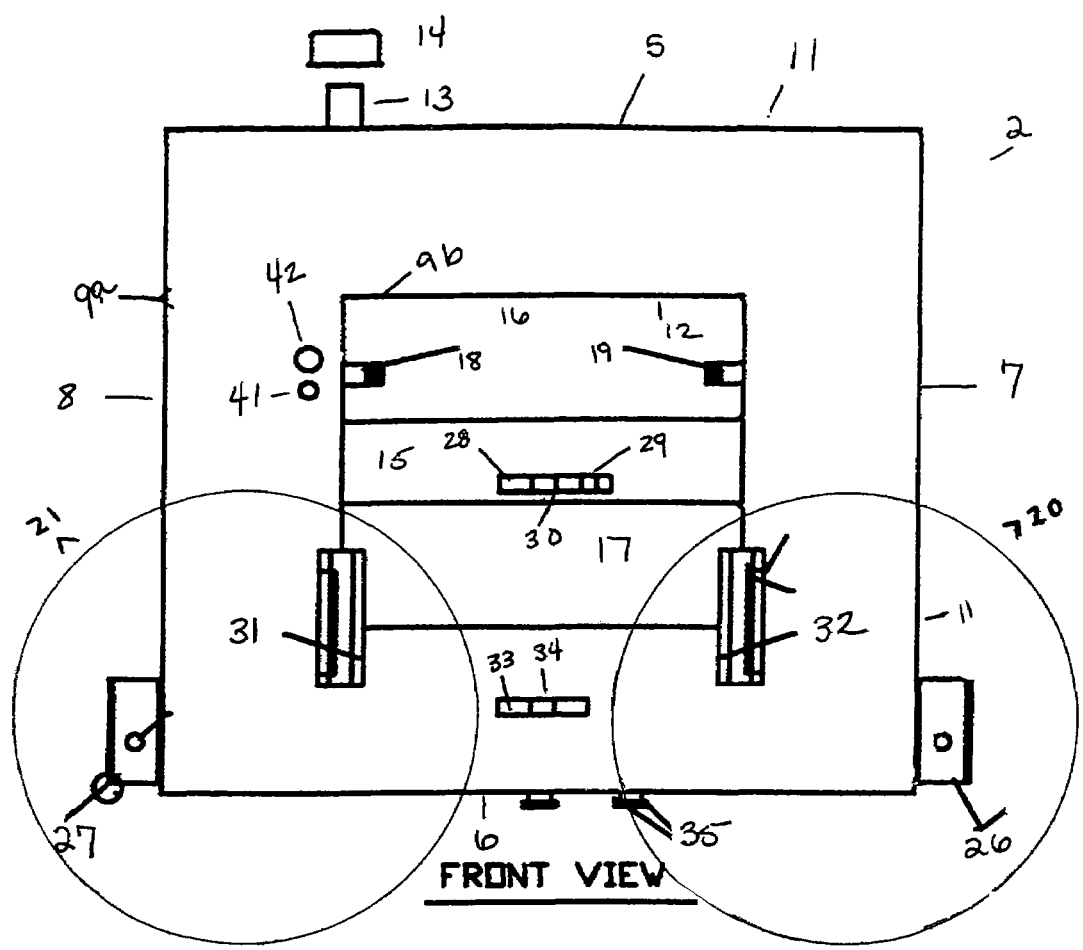
FIG. 2 is a front view of the present invention.
Figure 3:
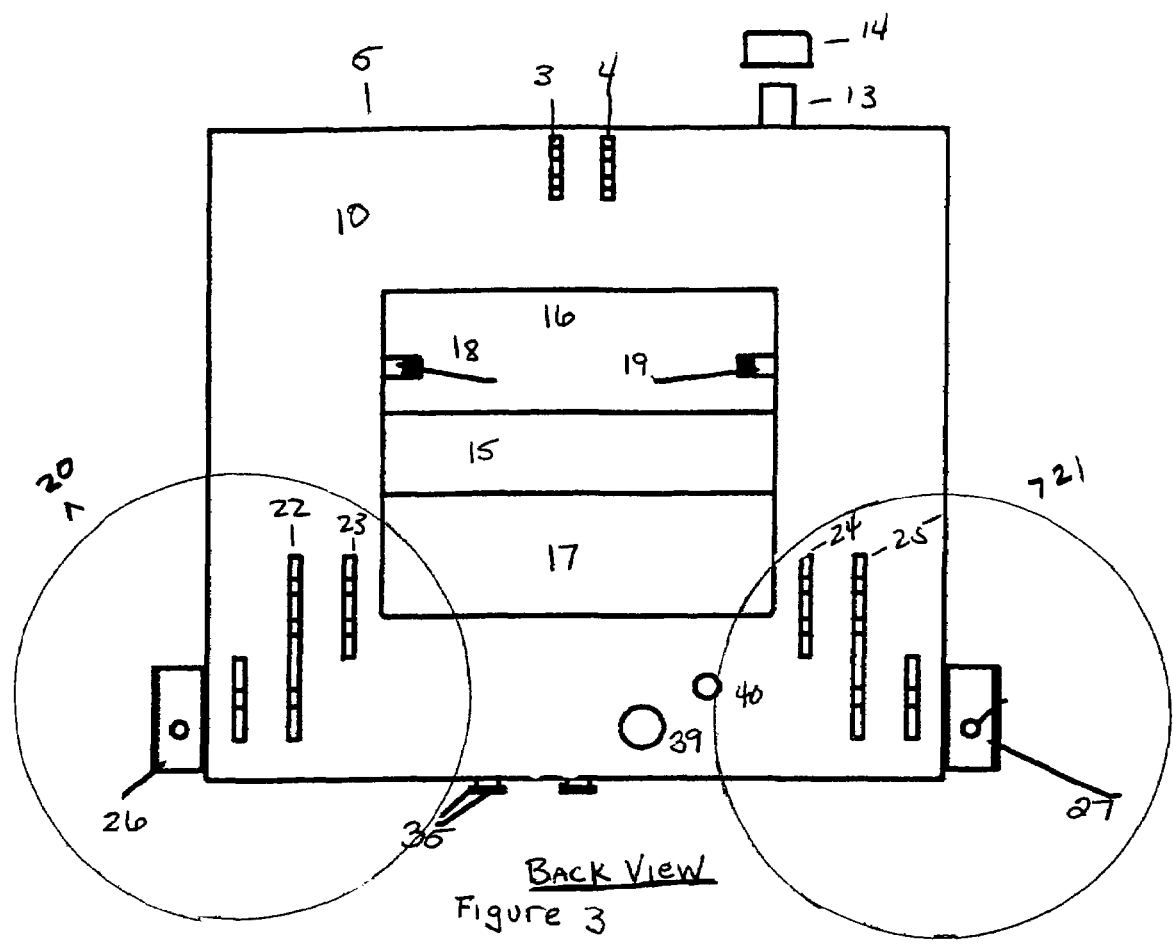
FIG. 3 is a back view of the present invention.
Figure 4:
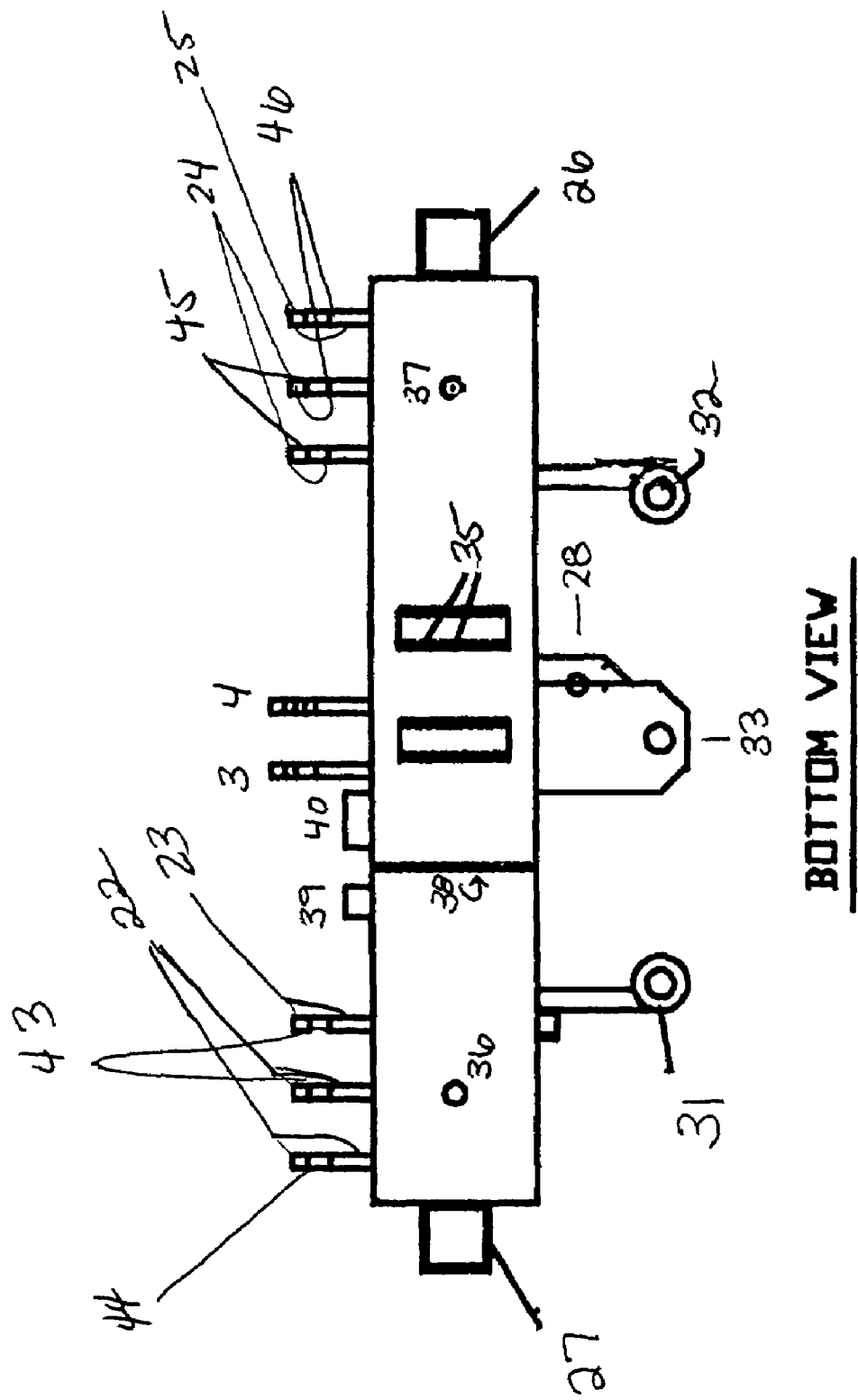
FIG. 4 is a bottom view of the present invention.
Figure 5:
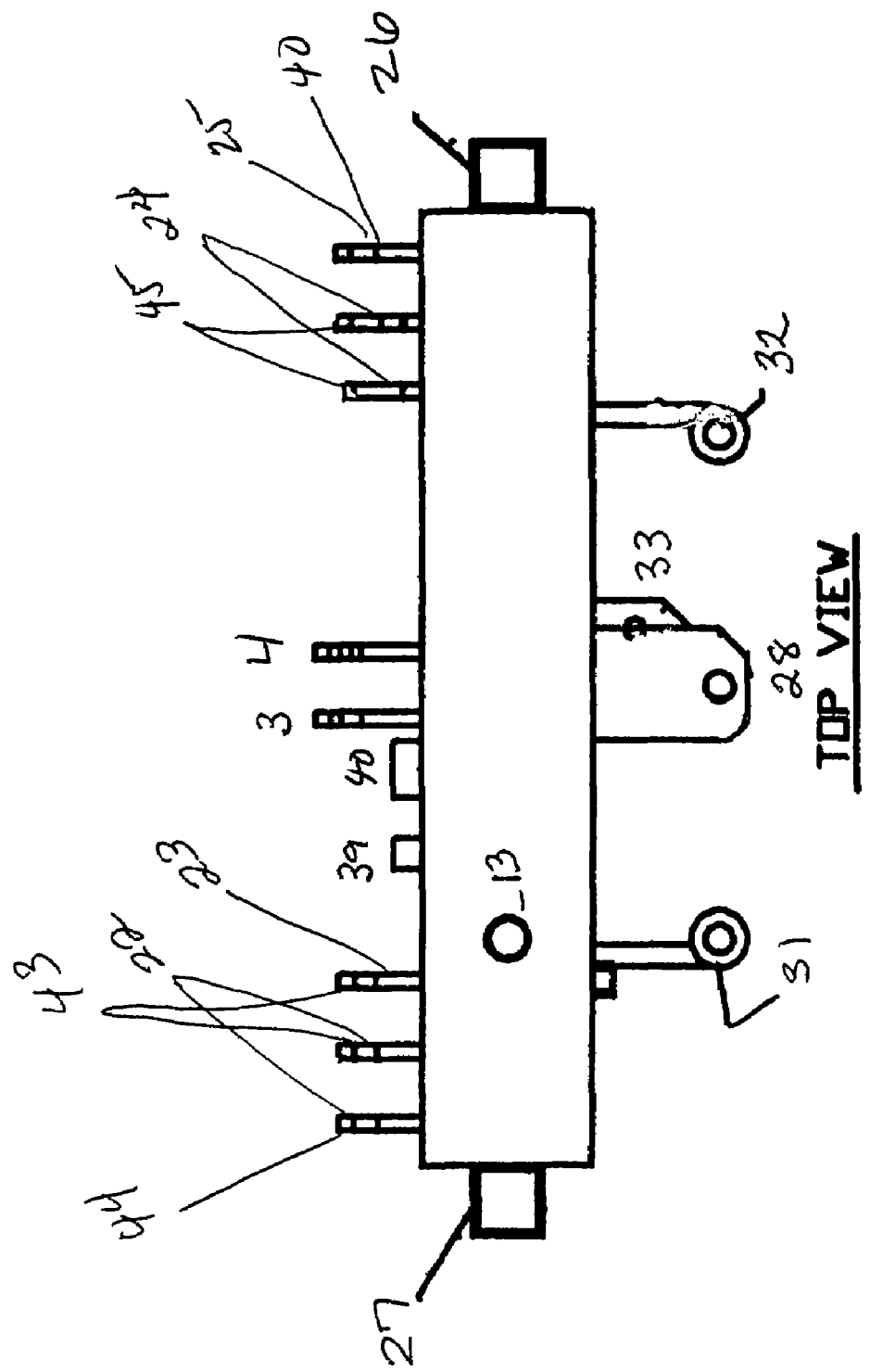
FIG. 5 is a top view of the present invention
Figure 6:
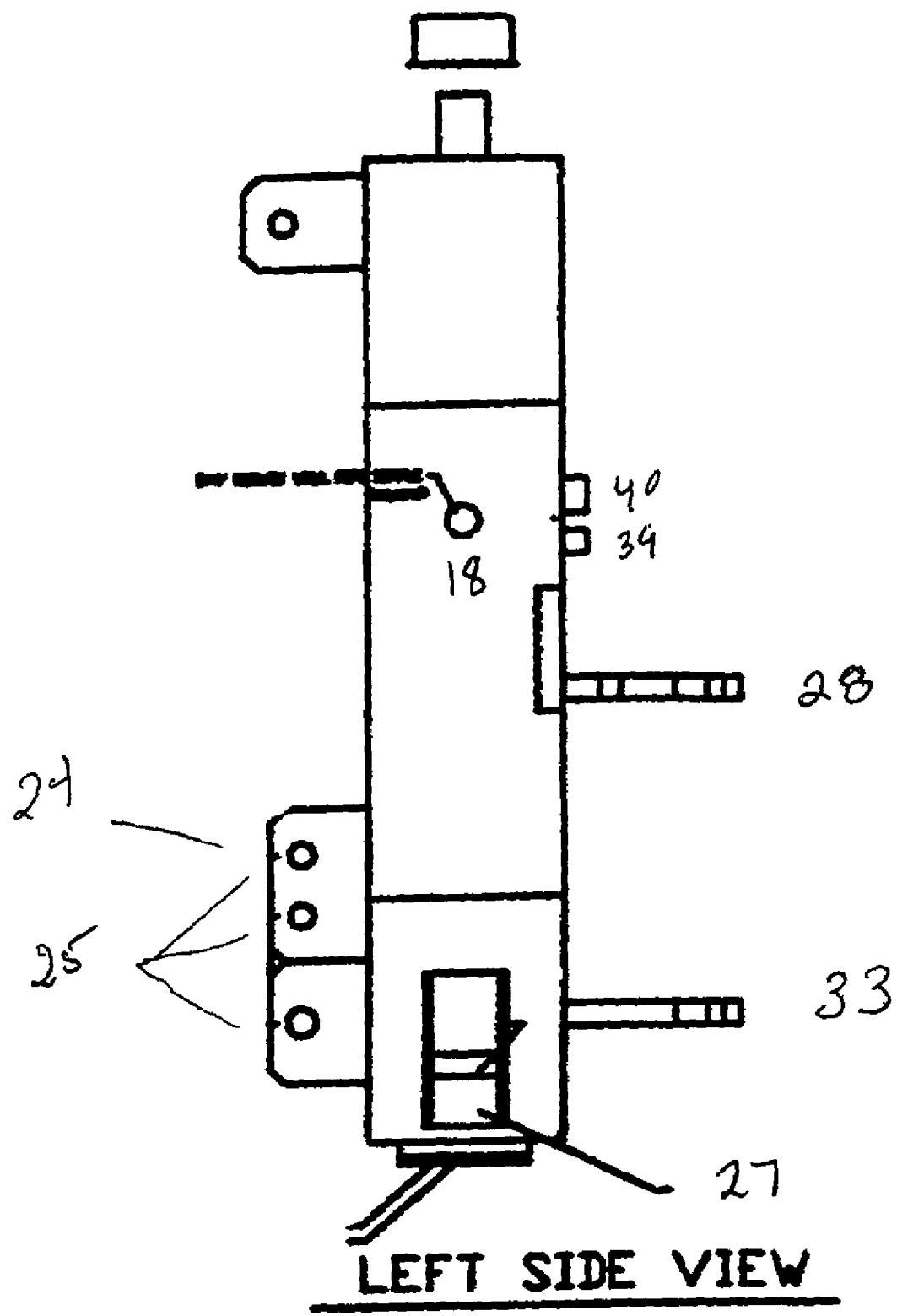
FIG. 6 is a left side view of the present invention.
Figure 7:
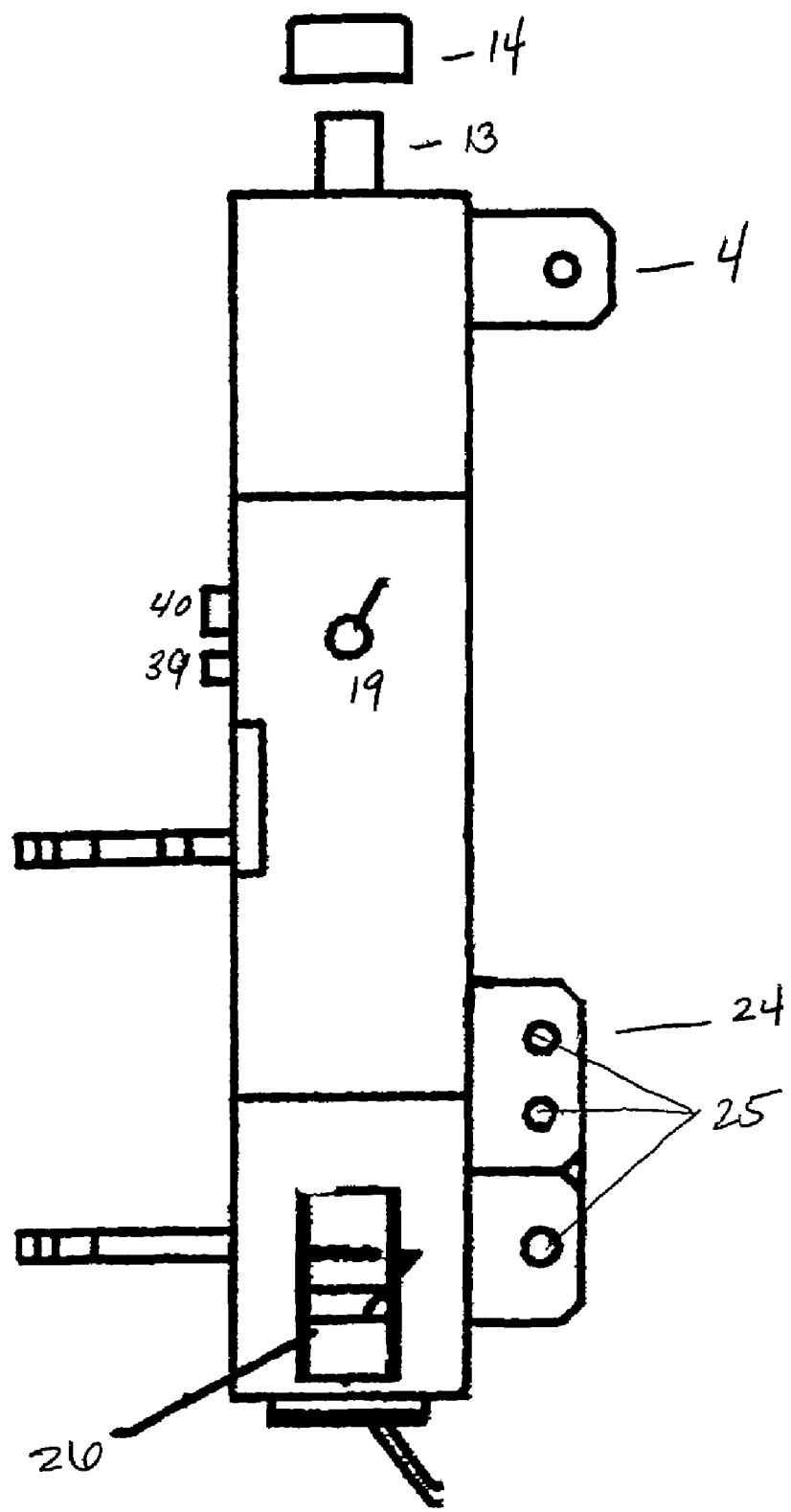
FIG. 7 is a right side view of the present invention.
Figure 8:
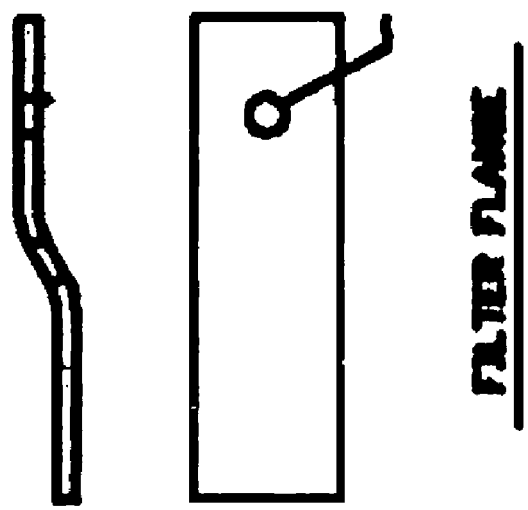
FIG. 8 is a perspective of the filter flange.
Figure 9:
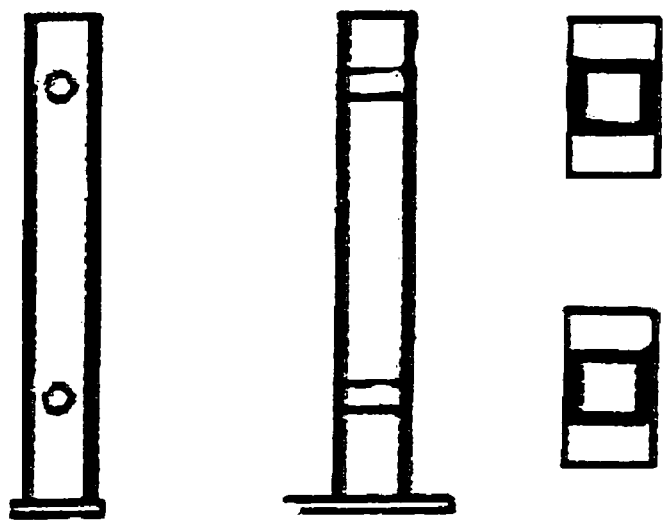
FIG. 9 is a perspective of the support foots.

In the preferred embodiment of the present invention there is a tractor with a removable attachment for securing an implement. The attachment is connected to the hitch of the tractor 1. The hitch is preferably a hitch of the type shown in our co-pending application, Ser. No. 09/552,080 filed Apr. 19, 2000, the disclosures of which are incorporated herein by reference. The apparatus has hydraulic tank 2 which contains a fluid. The fluid can be any suitable fluid such as an oil or water. The tank 2 or reservoir is comprised of a frame having a top member 5 and a bottom member 6. The top and bottom member 5 and 6 are joined together by a pair of side members 7 and 8. Although the figure depicts a generally rectangular configuration, any shape for the hydraulic tank 2 may be suitable. For example the hydraulic tank may be generally circular or have the shape of any other polygon such as a pentagon or a trapezoid, etc. Preferably no matter what shape is chosen there should be an opening in generally the center of the tank attached to the tank. This opening preferably extends from the front surface to the rear surface creating a generally ring shaped tank. This opening helps permit the operator of a tractor or other piece of equipment to view any device or implement attached to the tractor. Each member should be tubular or hollow in cross section. Where the frame is not generally rectangular in configuration as shown in the drawings, the top member is defined as that region in the upper portion of said frame and the side members are defined as that region of the frame on the sides thereof. The members usually have a front surface 9, a rear surface 10, an exterior surface 11 and interior surface 12. The interior and exterior surfaces of the members preferably contact the other respective surfaces. For example, exterior surface 11 contacts exterior surface 9 at 9a. Similarly, interior surface 12 contacts interior surface 9 at 9b. Although the cross section of the members in the figures is also rectangular, the cross section may be of any design so long as it provides an opening through the structure and has the required rigidity and strength and enough surface area to keep the hydraulic fluid inside the hydraulic tank cool. The cross section of the present invention in any embodiment should within the range of 5" to 50", preferably 6" to 40", more preferably 8" to 36" and most preferably 10" to 20".

Along the top member 5 a hydraulic tank fill orifice 13 is located with a hydraulic vent cap 14. The tank may be provided with a center bar 15 that extends from one member to the opposite member. The center bar 15 extends from the side member 7 to the side member 8 in a generally horizontal manner, and separates the center of the hydraulic tank 2 into an upper top open portion 16 and a bottom open portion 17. Preferably located on the interior surface 12 in the upper portion 16 are two opposing heavy wall pipe nipples 18 and 19 that allow for the release of pressure in the hydraulic tank 2.

The hydraulic tank 2 is capable of attaching to a hitch such as a three-point hitch of the conventional tractor or the hitch of our copending application discussed above. The hydraulic tank 2 has a pair of brackets located on the top member 5 rear surface 10, i.e., upper left three-point hitch center link flange 3 and the upper right three-point hitch center link flange 4.

The right outside adjustable stabilizer link flange 22 and right inside adjustable stabilizer link flange connect the stabilizer bar to the hydraulic tank 2. The left outside adjustable stabilizer link flange 25 and the left inside adjustable stabilizer link flange 24 connect the other stabilizer bar to the hydraulic tank 2. The flanges 22 to 25 are preferably adjustable so that their location along the side members can vary based on the type of attachment being connected to the hitch. Preferably the flanges are located in the lower region 20 and 21 of the hitch. In addition, the brackets 22 to 25 are preferably oriented toward the rear surface 10 of the members. For flanges the right and left inside adjustable stabilizer link flanges 23 and 24 there are holes for adjustable stabilizer link pins 43 and 45. For the right and left outside adjustable stabilizer link flange 22 and 25 there are right and left holes 44 and 46 for lower three point hitch pin.

The right support foot tube 26 is located on the exterior surface 11 of side member 8 in the lower region 20. The left support foot tube 27 is located on the exterior surface 11 of side member 7 in the lower region 21. These supports, make the attachment of the tank to the tractor easier when the tank has an implement attached.

The front surface 9 on the hydraulic tank 2 has a upper vibratory plow hinge flange 28 located on the front surface 9 of the center bar 15. Also located on the front surface 9 of the horizontal connecting member is the vibratory plow hinge locking pin hole 29 and the vibratory plow hinge pin hole 30. Located on the front surface 9 in the lower region 20 and 21 are trencher mounts 31 and 32 respectfully. The lower vibratory plow hinge flange 33 and vibratory plow hinge pin hole 34 are used to mount the soil subsurface trenching apparatus, pipe laying equipment or other suitable apparatus to the hitch, both are located on the front surface 9 of the bottom member 6. The flanges 28 and 33 may be adjustable along the hydraulic tank 2. The filter flange receiver 35 is located on the exterior surface 11 of the bottom member 6. There are also two opposing drain holes 36 and 37 located on the exterior surface 11 of the bottom member 6.

The baffle 38 is a flat plate that directs the flow of the hydraulic fluid can be viewed on the bottom member 6 on the exterior surface 11, the baffle 38 is mounted in the bottom member 6 and extends vertically internally in the bottom member 6.

Two couplings 39 and 40 are welded into external surface 11 of the bottom member 6 for attachments. There are an additional two couplings 41 and 42 located on the front surface 9 of the side member 8 for additional attachments.

It will be appreciated by those skilled in the art that the center bar 15 could also extend from the bottom member 6 to the top member 5 in a generally vertical orientation. In addition, fins can be attached either permanently or temporarily with additional flanges or pins. The fins can be attached to any of the members 5, 6, 7, or 8 on either surface 9, 10, 11, 12. Also, the amount of couplings can be increased or decreased. The surface area of the tank is not limited to the preferred embodiment which reflects the optimum surface area. The present invention covers all surface area that are within the minimum and maximum ranges for performance. The ranges of surface areas covered in the present invention are the following, the top member 5 can have a range of length of 15" to 54", preferably a length of 20" to 45", more preferably 25" to 40" and most preferably 30" to 35", the bottom member 6 can have a range of length of 15" to 54", preferably a length of 20" to 45", more preferably 25" to 40" and most preferably 30" to 35", the side member 7 can have a range of length of 10" to 54", preferably a length of 15" to 45", more preferably 20" to 40" and most preferably 25" to 35", the side member 8 can have a range of length of 10" to 54", preferably a length of 15" to 45", more preferably 20" to 40" and most preferably 25" to 35".

We claim:

1. A hydraulic system for an implement for a tractor comprising a reservoir for a hydraulic fluid, said reservoir having a tubular member having an inner surface and an outer surface, said tubular member being hollow in cross section and having an open area in said reservoir that extends from one outer surface to said opposite outer surface, said outer surfaces being joined by at least one side wall that forms an open area in said reservoir, wherein the reservoir is provided with a center bar that extends from one sidewall to an opposite sidewall in said open area said center bar being adapted to contain hydraulic fluid, said open area positioned in said reservoir so that an operator of a tractor can view the operation of an implement connected to said reservoir; and wherein one outer surface of said reservoir has a upper vibratory plow hinge flange thereon; and wherein there are first and second vibratory plow locking pin holes on said outer surface.

2. The hydraulic system according to claim 1 wherein a baffle is in said bottom member.

3. A hydraulic system according to claim 1 in which the surface area of said reservoir is increased by means of a fin.

4. A hydraulic system according to claim 3 which said fin is removable.

5. A hydraulic system according to claim 1 in which the surface area of said reservoir is increased by means of a heat sink.

6. A hydraulic system according to claim 1 in which the surface area of said reservoir is increased by means of insulation.

7. A hydraulic system according to claim 1 in which said hydraulic system is made of material with low thermal resistance.

8. The hydraulic system according to claim 1 wherein the center bar extends from one side wall to the second sidewall in a generally horizontal manner, and separates the reservoir into an upper top open portion and a bottom open portion.

9. The hydraulic system according to claim 1 wherein there are one or more pipe nipples located on an interior surface of said reservoir to allow for the release of pressure in the hydraulic tank.

10. The hydraulic system according to claim 1 that is adapted to be attached to tractor hitch.

11. The hydraulic hitch according to claim 10 wherein the tractor hitch is a three point tractor hitch.

12. The hydraulic system according to claim 1 wherein said reservoir has a first and second stabilizer link flanges to connect first and second stabilizer bars to the reservoir.

13. The hydraulic system according to claim 12 wherein said stabilizer link flanges are adjustable.

14. The hydraulic system according to claim 1 wherein there is at least one trencher mount on one outer surface of said reservoir.

15. The hydraulic system according to claim 1 wherein there is a lower vibratory plow hinge flange on an outer surface of said reservoir.

16. The hydraulic system according to claim 1 wherein a tank having means to attach said tank to a tractor on one side thereof and a means to attach an implement to said tank on another side thereof.

17. A hydraulic system for an implement for a tractor comprising:
   a reservoir for a hydraulic fluid, said reservoir having a tubular member having an inner surface and an outer surface, said tubular member being hollow in cross section and having an open area in said reservoir that extends from one outer surface to said opposite outer surface, said outer surfaces being joined by at least one side wall that forms an open area in said reservoir, wherein the reservoir is provided with a center bar that extends from one sidewall to an opposite sidewall in said open area said center bar being adapted to contain hydraulic fluid, said open area positioned in said reservoir so that an operator of a tractor can view the operation of an implement connected to said reservoir; and
   wherein the center bar extends from one side wall to the second sidewall in a generally horizontal manner, and separates the reservoir into an upper top open portion and a bottom open portion; and
   wherein there are one or more pipe nipples located on an interior surface of said reservoir to allow for the release of pressure in the hydraulic tank.

18. The hydraulic system according to claim 17 that is adapted to be attached to tractor hitch.

19. The hydraulic system according to claim 18 wherein the tractor hitch is a three point hitch.

20. The hydraulic system according to claim 17 wherein said reservoir has a first and second stabilizer link flange to connect first and second stabilizer bars to the reservoir.

21. The hydraulic system according to claim 20 wherein said stabilizer link flanges are adjustable.

22. The hydraulic system according to claim 17 wherein one outer surface of said reservoir has a upper vibratory plow hinge flange thereon.

23. The hydraulic system according to claim 22 wherein there are first and second vibratory plow locking pin holes on said outer surface.

24. The hydraulic system according to claim 22 wherein said flange is adjustable.

25. A hydraulic system for powering an implement for a tractor comprising a reservoir for a hydraulic fluid said reservoir having a top member and a bottom member, said top and bottom member being joined together by a pair of side members, wherein a baffle is in at least one of said top or bottom members, wherein said baffle directs the movement of a hydraulic fluid to said implement, each of said top and said bottom member being hollow in a cross section, and having an inner wall and an outer wall, each of said side members having an inner wall and an outer wall and said side members being hollow in said cross section such that said hydraulic fluid contained in said members can flow from one member to another, wherein there is a hollow center bar extending from one said member to a second said member and adapted to contain hydraulic fluid, said inner walls of said top member, bottom member and side members forming an open area in said reservoir so that an operator of a tractor can view the operation of said implement connected to said reservoir through said open area and wherein there are one or more pipe nipples located on an interior surface of said reservoir to allow for the release of pressure in the hydraulic reservoir.

26. The hydraulic system according to claim 25 wherein there is at least one trencher mount on one outer surface of said reservoir.

27. The hydraulic system according to claim 25 wherein there is a lower vibratory plow hinge flange on an outer surface of said reservoir.

28. The hydraulic system according to claim 27 wherein said flange is adjustable.

29. The hydraulic system according to claim 25 wherein one outer surface of said reservoir has a upper vibratory plow hinge flange thereon.

30. The hydraulic system according to claim 29 wherein there are first and second vibratory plow locking pin holes on said outer surface.

31. The hydraulic system according to claim 29 wherein said flange is adjustable.

32. A hydraulic system for powering an implement for a tractor comprising:
   a reservoir for a hydraulic fluid said reservoir having a top member and a bottom member, said top and bottom member being joined together by a pair of side members, wherein a baffle is in at least one of said members, wherein said baffle directs the movement of a hydraulic fluid to said implement, each of said top and said bottom member being hollow in a cross section, and having an inner wall and an outer wall, each of said side members having an inner wall and an outer wall and said side members being hollow in said cross section such that said hydraulic fluid contained in said members can flow from one member to another, wherein there is a hollow center bar extending from one said member to a second said member and adapted to contain hydraulic fluid, said inner walls of said top member, bottom member and side members forming an open area in said reservoir so that an operator of a tractor can view the operation of said implement connected to said reservoir through said open area; and
   wherein one outer surface of said reservoir has a upper vibratory plow hinge flange thereon; and
   wherein there are first and second vibratory plow locking pin holes on said outer surface.

* * * * *